(12) United States Patent
Kohler

(10) Patent No.: X8236
(45) Date of Patent: Jun. 6, 1834

(54) ADDING MACHINE

(76) Inventor: Daniel Kohler

Daniel Kohler, Sunbury, Pennsylvania.

Letters Patent.

The Schedule referred to in these Letters Patent, and making part of the same, containing a description in the words of the said Daniel Kohler, himself of his improvement in the Machine for Adding.

To all to whom these presents shall come.

Be it known that I Daniel Kohler of Sunbury in the County of Northumberland, and State of Pennsylvania, have invented a New and useful adding Machine, and that the following is a full and exact description of the construction and operation of the said Machine as invented by me.

The said adding Machine, or ready, correct and quick calculator, i.e. add and in some cases subtract, any numbers or sums, not exceeding several thousands till the particulars numbers, or sums, thus added amount to one Million, and then on by noticing the same. It is chiefly thought as one, the quickest and truest instruments yet invented to add lumber, the cargo of a ship, boat, or wagons, and any thing of the kind, also it can add Book accounts, amounts of Bills &c; in short it can be used wherever addition is required. It will work so exactly correct that [illegible] not an unit can be erred by itself and a boy who knows the figures from one to 1000, and can count 1100 can be in most all cases, the person attending to the Machine or instrument, and see from the same, if taught to understand it as well as a clock, the total amount, as quick at any time, of what is in [illegible] or [illegible]lly added, or counted, as from a clock, the true time of the day.

To make use, and rectify the Machine, and to see the amount, or total of which is added, from the same it must be observed. First, how to make the Machine. By seeing a model or drawing of the same you can notice the following viz. The brass wheel and ring are divided in 100, equal divisions corresponding to each other, the divisions on the ring are numbered viz. 1.2.3.4.5.6.7 to 100, the pushing wheel is sufficiently numbered at way [illegible] division as seen at 10.20.30.&c. this division is sufficient when the Machine machine is made on a small scale of about five to 8 inches in diameter,
and good when there are only small numbers. or sums not exceeding some
hundred are to be added, such as boards, planks, and the weight of boxes
of goods, barrels &c. but for the cargo of ships, boats, book accounts &c, where
the sums or numbers exceed several hundred, both ring and wheel are
to be divided into 1000 equal divisions corresponding to each other,
(i.e.) into 10 grand divisions, as seen at 10.20.30, &c each grand division
into ten subdivisions making 100 in circumference, and each subdi-
vision into ten sub subdivisions making 1000 in circumference,
100 in one grand division, and 10, in one subdivision. For this
division the wheel and ring must be large enough to distinguish
the divisions, or so large as the purchaser requires it, but the numbers, 1. 2. 3,
4 &c to 100, are then to be considered as tens, (i.e.) as if there were cyphers
added or affixed to them, and the sub-subdivisions between them,
as units &c. Both ring and wheel are made of brass, sufficient in thickness
the ring is engraved on a circular sheet, equal in radius with the
breadth of the ring, and radius of the pushing wheel, the circular,
sheet on which the ring is engraved, has a hole in the centre through which
a pivot or pinion, from the works under the wheel, and thereto fasten-
ed, is extended, to which to the pinion the pushing wheel is fastened,
& with it the pushing wheel revolves as pushed, This ring and wheel to which
the wheel by a pinion is fastened, and the ring engraved is put on a board
of mahogony - or other good wood sufficient in thickness fastened at
No. 75. by a small hinge, and by a spring and notch at No. 25, so that it can
be opened like a watch, and regulated. The ring have a small hand at No. 100,
extending over the divisions of the pushing wheel, and at the end, the
hand has a small screw. The board to which the above is fastened, has a
roomy place for the clock-work under the circular sheet, and at the place
where the hands, and face entered when shut, it is cut through, in a circular form,
with a glass over it, through which the face and hands are seen, and the amount
or total can be taken of what is added. Inside, or the clock work has two plates
and posts to hold them together, between the plates are five wheel and their
pinions, one of the pinion is or works in the circular sheet, and a small
elbow elbow, the other two, and wheelwork in the plates. the three largest wheels
have each sixty teeth, the two other, an equal number, and the pinions
each six. the pinion in the sheet drives the largest lower wheel, and
which wheel is fixed to the pinion above it, so that it will drive
the pinion and longest hand, this pinion drives the next largest
wheel, and which drives the one of the middle sized wheel, and
last pinion - these two wheels are fixed on this pinion station=
ary - the other middle wheel is driven by the middle wheel, and has
the 2nd hand - the largest upper wheel, is driven ~~is driven~~ by the pinion
to which the two wheels are fixed. and has the shortest hand, at
that end of the plates, where the pinion works in the sheet, is a
small piece fixed at the opposite side, is a small lever, at the lower
right and left sides of the plate, are on each side one holder through
or under which holders, the plate and clock work can be drawn back=
wards, and forwards by turning the lever loose from the plate so that it will
gear, and ungear when required. The face is divided into ten equal=
divisions, and the divisions are numbered. 1.2.3.4.5.6.7.8.9.10. the hands
revolve on the face when the pushing wheel is pushed, and accordingly
as it is pushed or turned. The pushing wheel revolves 10 times untill
the longest hand, once the longest hand turns around 10 times untill
the 2nd, once, and the 2nd revolves 10 times untill the shortest once.
Second. To use the Machine for adding.
Case 1 - When the wheel and ring are divided into 100 divisions. Rule,
unscrew the small screw. so that it can be pushed easy, and not too
easy, then push that division on the pushing wheel, which is oppo=
site the number to be added up against the hand on the units side
if the number exceeds 100, push the units and tens, notice where it stands
and turn it totally around as often as they are hundreds in the num
=ber to be added, (Note) the wheel is always to be pushed right round
and when done adding, it ought to be secured so that it will re=
main in that posture, until the total is seen.
Example 1 - Rectify the machine, and push the divisions opposite the
following numbers, (i.e.) add the following 10.11.22.33.41.60.
75

71. 90. 81. 3. 98. 7. and see their total or amount. (Answer 537) [illegible]
(Note) to see the total, see the last head. to see the amount
Example. 2. Rectify the Machine, and push the following, or add
the following, 10. 9. 7. 60. 70. 90. 75. 20. 34. 31. 37. 40. 7. 8. 17. 19. 13. 13. 70. 65.
4. 5. 34. 72. 83. 95. 90. 80. 83. 41. 43. 36. 27. 23. 49. 68. 55. 48. 20. 30. 40. 13. 75. 90.
11. 9. 77. 88. 89. 99. 33. 34. 13. 2. 31. 29. 48. 49. 51. and see the total (Ans. 2,531.
Case 2. when ring and wheel are divided in 1000. divisions or so
considered. Rule proceed as in case 1. by screwing and adding, or
pushing, the numbers to be added, and if the number or sum be
added exceeds 1000, push the hundreds, tens, and units. Notice
where it stands, and turn it once, totally around for every thou=
sand in the sum or number given. Example. 315. 600. 770. 860. 100.
110. 230. 445. 990. 765. 320. 795. 880. 995. 115. 200. 300. 450. 605. 700. 351. 605.
540. 460. 558. 465, 2130, and see the amount. [Ans. 16,150]
Push first 130, then the pushing wheel has 150. Notice these, and
take hold at the little nob or elsewhere and turn it twice around.
Thirdly. To rectify the Machine;— A. when the Machine is divided into
100 divisions. 1, when there are only a few hundred added.
Rule, take hold at the little nob on the wheel or elsewhere, and turn it
backwards, or left around until all the hands are at 10. & 100, at 100,
outside on the wheel, and it is ready for addition. 2nd. when there
are Units of thousands, and units, and tens of thousands added.
Rule, unscrew the outer screw on the hand, push 100 to 100, screw it
again, open it at the spring at No 25. turn the lever on the sheet next to you
with your right hand towards you, draw the block work a little to=
wards the lever, take a slide hold at the largest wheel next to the lever.
with your fore finger move your finger in a shutting manner, by holding
it against the wheel, turn the wheel in that manner until all the hands
are at 10, or near, if near, turn the longest hand to 10, push the block work
from you into gear again, turn the lever as it was when made open, shut it,
unscrew the little screw at 100, so that it will permit the wheel to turn
and not too easy, and the machine is ready for a new addition.
B. when the Machine is divided in a 1000. divisions. 1. When
There there are only a few thousands added. Rule, proceed as if there
were a few hundreds added. see Rule A (1). 3. When there are tens
of thousands, and tens and hundreds of thousands added; perform what
is prescribed under A [2] above. (Note) others might be given, howev
this is sufficient. Fourthly, to see the amount or total of the machine.
Case 1: When it is divided in 100 divisions.— Rule. make places for
units. tens. hundreds. units of thousands, and tens of thousands. let
the number on the pushing wheel in the units and tens places. that
of the longest hand to the left in the hundreds place. That of the 2nd. on
the place of units of thousands, and that of the shortest hand in the
place of tens of thousands. i.e, the shortest hand counts tens of
thousands. the 2nd, units of thousands, the longest hundreds.
and the outer wheel tens and units, and observe to make cyphers
for those hands that are not past 1. or pronounce for hands which
are past 1. those units past by them, beginning with the shortest
hands and those tens and units on the wheels, and it will be the
total, or amount of what is added. Note 1. cyphers on the left
are of no value, and when the longest hand only has past one
of its units in its revolution, and no other, the others count
nothing, and also when the longest and 2nd hand, have past one of
the units in their revolution and the shortest remain between
10 & 1. it will count nothing. 2, when the wheel has 100 at 100,
when done adding, the longest will be at one of its units in its
revolution, or at 10. if at 10, it will count, 0. and the 2nd hand
will count its tens, and when the longest hand is at 10— the 2nd
will be at one of its revolutions or at 10.- if at 10 it will count 0.
and the shortest will count its tens.— likewise when the shortest
is exactly at 10, all the other hands will be there also and the
wheel will have 100 at 100; and no superior one in value, will
be exactly at one of its divisions, except all the inferiors are
at 10, and the wheel has 100 at 100. and when all are full the
total will be according to this case 100.000. and according
to case 2nd. 1000000. and the machine will go on, as if started
anew anew, or as a clock when 12.— 3. when the wheel has between 90 and 100. the longest hand will appear to be nearly at one of its divisions. but it is not to be put down, that only which it has past last, until the wheel has 100 at 100, or is past 100. Also the 2nd hand will not be at one of the divisions in its revolution until the longest hand is at 10. and unless the longest hand is at 10. that number to which the 2nd is near coming to. is not to be put down— that only which it has past last. until the longest is at 10. or past. and also the shortest hand will not be at one of its divisions in its revolution until the 2nd hand is at 10. and before the 2nd hand is at 10. that number to which the shortest, is near coming to, is not to be put down. that only which it has past last until the 2nd is at 10 or past &c. 4. the whole will regulate each other, and each inferior in value will demonstrate the trueness and exactness of all its superiors. Theorem 1.— suppose 35 is on the wheel the longest hand has past 0. the 2nd past 6., and the shortest past 8. what is the total. Answer 86,335.

Units — or pronounce 8 eights
Tens —
hundreds — 6 six 100
units 1000 — 3 three 100
10 of 1000 — 3 thirty and
5. five
86.335

Theorem 2—

Suppose 60 on the wheel longest past 2, the 2nd not past 1. but the shortest is past 7. what is the total ? Answer 70.260.
Theorem 3.— suppose the wheel has 100 at 100 the hand is past 4. the 2nd past 9. and the shortest is not past 1. what is the total Answer 9400— Theorem 4. suppose the shortest hand has past 8. and none of the others have past 1. but the wheel has 6. how much is it. Ans 80,006. — Case 2. when the ring and wheel are divided in 1000 divisions— Rule, make places for units, tens, hundreds, units of 1000, 10 of 1000, and 100 of 1000, set the number of the wheel in the three places on the right by. In the places places of units, tens, & hundreds, and that of the longest hand to the left in the place of units of thousands, that of the 2nd in the place of 10 of 1000, and of the shortest in the place of 100 of 1000 - or pronounce for the hands as in case 1. and affix the figures of the wheel for the total.

Note. Cyphers and observations the same as in case 1st.

Exd
W.G.

Witness
S. P. Shindle
Oscar Bradford

Daniel Kohler

2773 Words]